United States Patent [19]
Glance

[11] Patent Number: 5,575,533
[45] Date of Patent: Nov. 19, 1996

[54] BLOW MOLDED SEAT FRAME WITH INTEGRAL REINFORCEMENT

[75] Inventor: Patrick M. Glance, Plymouth, Mich.

[73] Assignee: Concept Analysis Corp., Plymouth, Mich.

[21] Appl. No.: 202,953

[22] Filed: Feb. 25, 1994

[51] Int. Cl.$^6$ ........................................... B60N 2/42
[52] U.S. Cl. ........................................... 297/452.2; 297/232
[58] Field of Search ............................. 297/232, 216.13, 297/452.18, 452.19, 452.2

[56] References Cited

U.S. PATENT DOCUMENTS

| | | | |
|---|---|---|---|
| 4,365,840 | 12/1982 | Kehl et al. | 297/232 X |
| 4,585,273 | 4/1986 | Higgs et al. | 297/452.18 |
| 4,804,226 | 2/1989 | Schmale | 297/216.13 |
| 5,253,924 | 10/1993 | Glance | 297/216.13 X |
| 5,382,083 | 1/1995 | Fecteau et al. | 297/452.2 |
| 5,439,271 | 8/1995 | Ryan | 297/362.12 X |

FOREIGN PATENT DOCUMENTS

| | | | |
|---|---|---|---|
| 535414 | 1/1957 | Canada | 297/452.18 |

*Primary Examiner*—Peter R. Brown
*Attorney, Agent, or Firm*—Waters & Morse, P.C.

[57] ABSTRACT

A blow molded vehicle seat frame system with integral restraint safety belt comprises a blow molded full bench, split bench or high back seat frame with discrete, strategically-placed, insert tubular beams to provide seat and seat belt mounting and load carrying capacity. A molded back contains tubular side cavities housing non-circular reinforcing beams therein. A telescoping tube at the top of the beam provides a shoulder belt height adjustment mechanism. The reinforcement beams provide an efficiently designed load path wherein the belt forces resulting from a crash situation are directed through super-high strength roll form metal tubular beams directly to the vehicle seat track or pedestal mounts. The primary load carrying seat component members are designed structurally to create discrete displacement occupant energy absorption to provide safe occupant crash kinematics and deceleration forces. The relative location and design of the load carrying members are arranged to create an efficient light weight structure and permit use of a low modulus, light weight blow molded seat cushion and back in the seat frame structure.

27 Claims, 3 Drawing Sheets

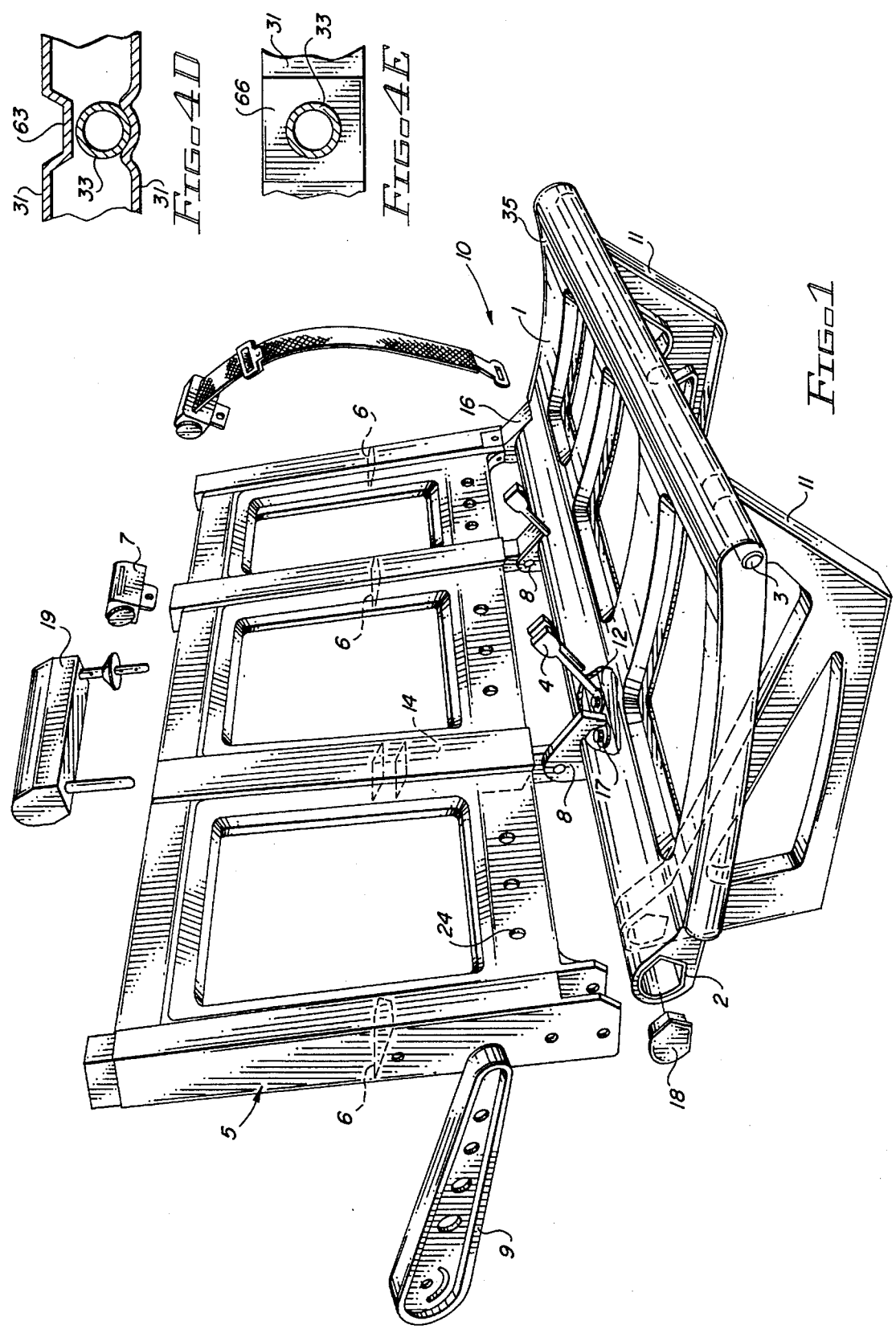

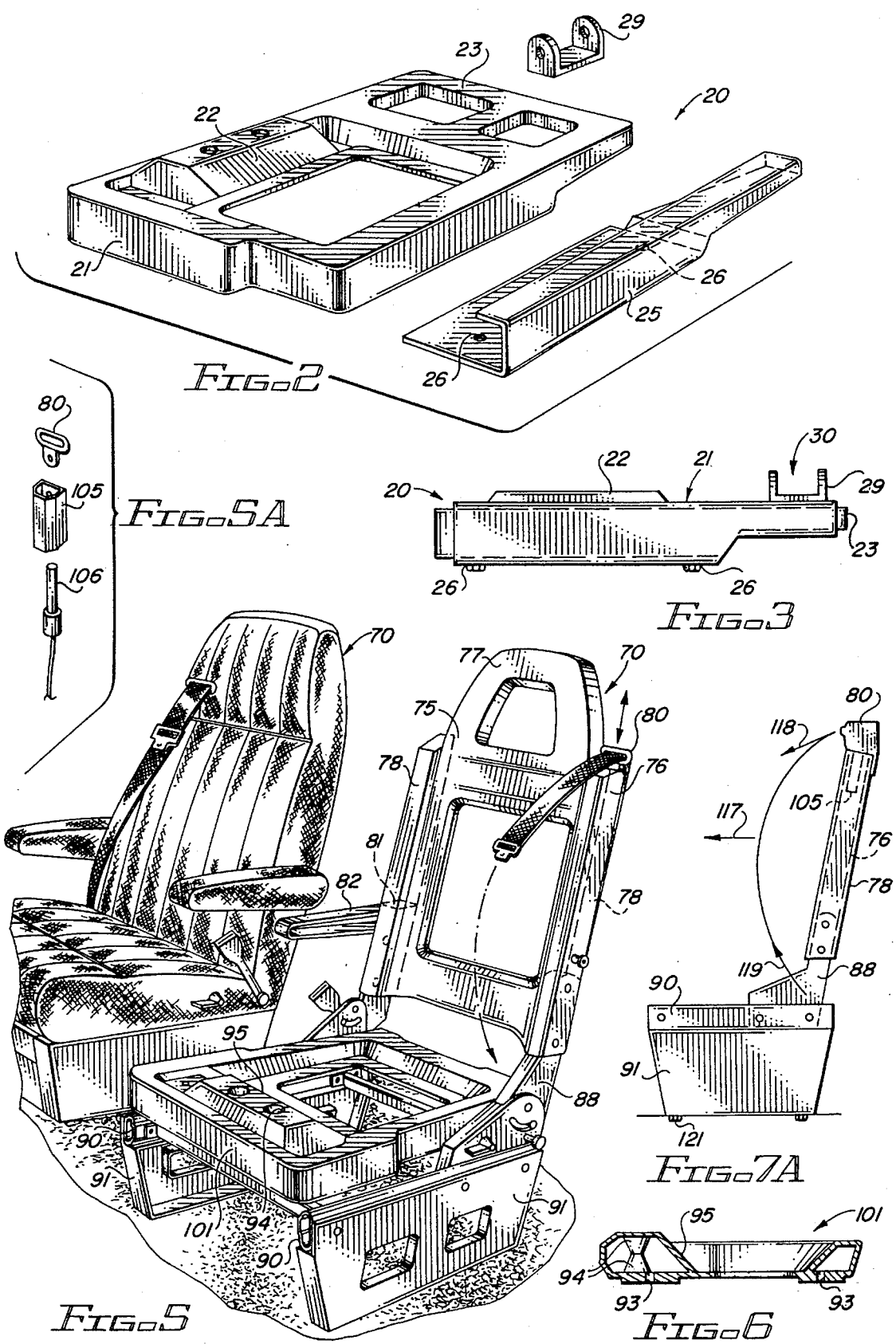

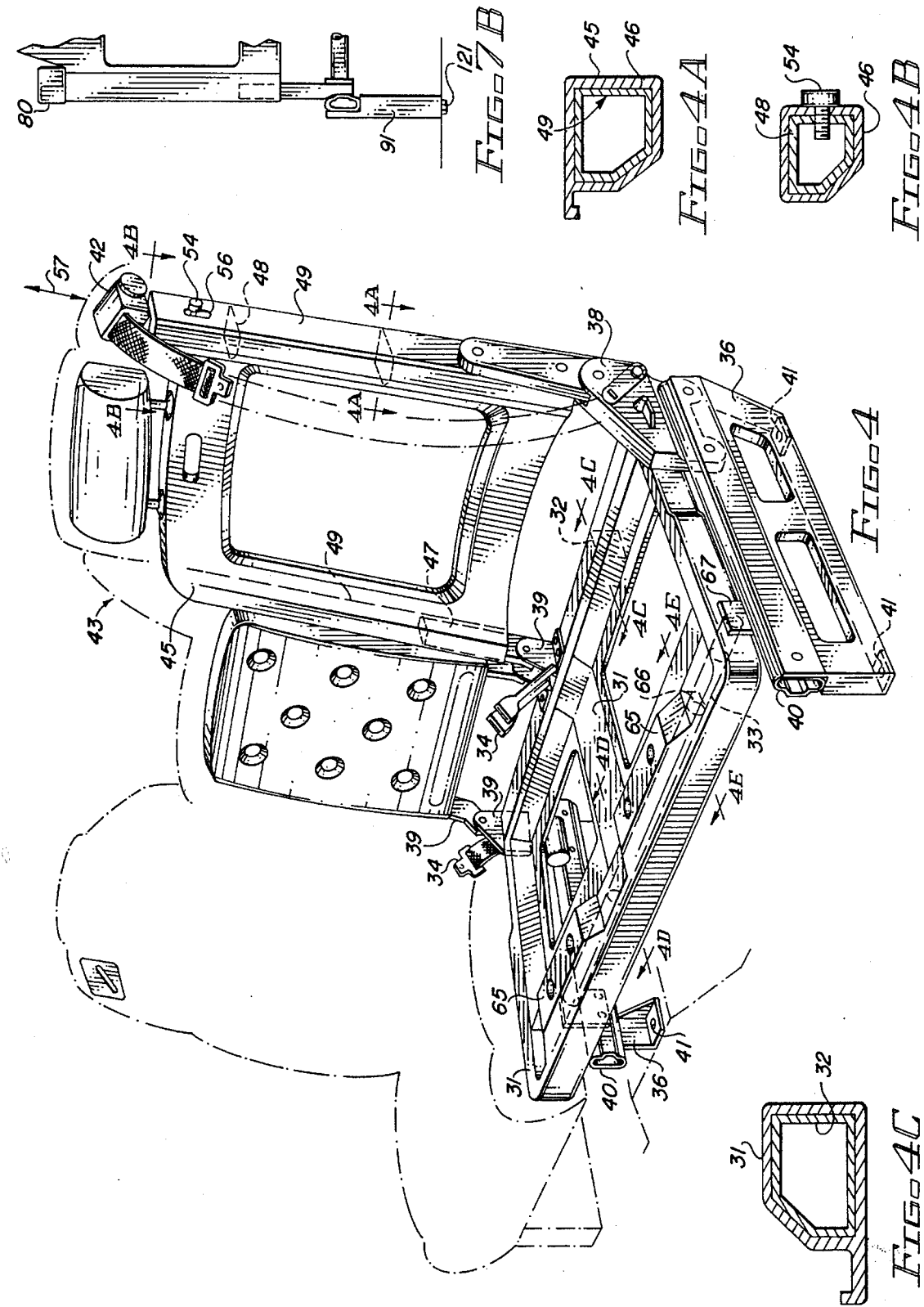

BLOW MOLDED SEAT FRAME WITH INTEGRAL REINFORCEMENT

BACKGROUND OF THE INVENTION

Conventional blow molded seat frames are utilized in rear seats of some automobiles. These are relatively weak components that do not carry seat belt loads. Applicant's U.S. Pat. No. 5,253,924 discloses the construction of a front, low back, bucket seat that utilizes a blow molded seat back frame reinforced with a vertical beam at one side to carry shoulder belt loads produced during a vehicle crash situation.

An object of the present invention is to provide further improvements with blow molded seat frames consisting of strategically reinforcing the blow molding with high strength, roll formed metal tubes that permit creation of belt carrying lower seat cushion frames, full bench frames, split bench frames, and high back captain's chairs. This invention permits the use of integral restraint seating for automotive vans, trucks and recreational vehicles without an increase in seat frame cost through the employment of a simple, commercially available blow molding and roll form process.

Another object of the present invention is to apply the principle of efficient load path management to provide controlled occupant energy dissipation by virtue of the seat frame permanent set during vehicle crash.

The design approach utilizing a hollow, blow molded body inserted with simple roll form metal tube has been extended to cover other seat applications and the lower seat structure.

SUMMARY OF THE INVENTION

In accordance with the present invention, an improved seat frame system consisting of both lower cushion and upper back frame are insert blow molded and strategically inserted with roll formed metal, tubular beams. The beams are formed with the super high strength tubes that are designed to carry the major occupant restraint belt loads during a vehicle crash. These structural tubes automatically provide load bearing capabilities for the seat structure for other normal load contributions.

The present invention comprises designs for various specific integral restraint seating applications.

For a full bench and split bench seat, the lower cushion is blow molded from an inexpensive talc-filled polyethylene or other suitable plastic. The molded cushion frame body has a molded-in cavity at a rear side that provides for inserting a rear cross member or reinforcing beam in the form of a roll formed metal tubular member running horizontally across the rear of the cushion. Lap and lower shoulder belt attachments and floor pedestal attachments are secured to the rear cross tube member. A smaller front cross member is utilized in the front of the cushion. Variations in size and shape of the front and rear cross members are utilized for different seat cushion frames, including a front automotive split frame cushion, a light truck split frame, a two, three or four place van bench seat, and a captain's chair.

The upper seat back for the full bench is blow molded and inserted with roll formed vertically mounted beams. The beams fit tightly into cavities that are molded in the blow molded back frame body. A full bench seat accommodates three or four vertical beams. The beams provide for upper shoulder belt attachment and structure and carry the upper belt load directly to the bench seat horizontal cross member through an intermediate latch bracket.

The present invention represents a significant improvement because it permits integral restraint, removable seating. This is particularly desirable for van applications. When the rear bench and captain's chair are removed from a van, all the belt attachments are removed with it. Therefore, the seat and belts become a self-contained, occupant restraint system. There is virtually no cost increase in providing this added occupant feature and safety, because the design approach for the seat frame system of the present invention is weight and cost competitive to current conventional steel frames, yet much stronger.

A captain's chair with a high back seat permits the blow molded seat back to integrate the headrest and provide cavities for tube insertion on each side of the frame. The load path has been designed to transfer all belt loads directly to the seat track. This permits use of a simple blow molded pan without insert tubes and also permits blow molding on the inboard side of the seat back without major reinforcement or full length tube insertion. The approach of designing strategically-placed tube inserts only where reinforcement is required reduces mass and cost. Furthermore, by designing an efficient load path to carry the belt forces directly to the vehicle seat mounts, the seat system mass and cost can be minimized. The design approach in the present invention shows how to achieve efficient load path and occupant safe crash energy management.

This invention has further applications of reinforcing blow molded non-automotive seat frames such as marine applications, mass transit, and non-vehicle seating.

The use of a vertical, up-right hollow tube on a seat back outboard side permits simple installation of a side member telescoping tube inside the full length tube for creation of a telescoping shoulder belt height adjuster.

A number of variations in the design, construction, and materials are possible. The blow molding could be from any suitable thermoplastic resin. The blow molding process could be substituted with roto-casting or lost-core molding or twin sheet vacuum forming. All these processes produce hollow close section bodies suitable for insertion with a reinforcement tube.

A number of different materials could be utilized for the insert beams, including steel, aluminum, magnesium, composite or plastic, and the beams can be manufactured from roll forming, extrusion or other process. Likewise, the size, cross-section and shape of the tube can vary, and the reinforcement beam member could be external as well as internal to the molded frame.

Preferably, a talc-filled high density polyethylene, Paxon, is used for the blow molding, and the beam cavity is inserted with a Martinsite, high strength roll formed steel (hollow) tubular beam for either the upper or lower seat frame.

DESCRIPTION OF THE DRAWINGS

FIG. 1 is a perspective exploded view of a full bench seat frame showing general construction of the invention.

FIG. 2 is a perspective view of a driver front split bench seat cushion frame showing an exploded general construction off the invention.

FIG. 3 is a rear assembled view of the FIG. 2 driver front split bench seat cushion frame.

FIG. 4 is a perspective view of a truck split bench seat frame showing general construction of the invention.

FIGS. 4A to 4E are sectional views taken along lines 4A—4A to 4E—4E of FIG. 4.

FIG. 5 is a perspective view of a pair of captain's chairs, one covered and one uncovered from foam and trim. The uncovered captain's chair frame shows general construction of the invention.

FIG. 5A is an exploded perspective view of the components of a seat belt height adjustment mechanism employed in a seat with full length vertical beam as shown in FIG. 5.

FIG. 6 is a side elevational view of the seat cushion of FIG. 5.

FIGS. 7A and 7B are schematic side and rear elevational views, respectively, of the captain's chair of FIG. 5, showing the load path management system for transferring belt load stresses to the seat support structure.

DESCRIPTION OF PREFERRED EMBODIMENTS

Full Bench Seat:

A bench seat frame 10 illustrated in FIG. 1 comprises a blow molded cushion 1 having a rear tubular cross member 2 and a front cross member 3. The rear cross member is attached to a lower belt latch 4 and to the floor pedestal 11. The belt latch can be bolted to the cross member by bolt 12.

The rear cross member 2 is a major structural member and is preferably constructed as a roll formed super high strength steel tube to achieve a low structural mass. The front cross member resists occupant anti-submarine loads (sliding down and forward) during a crash and can be smaller than the rear cross member.

The full bench blow molded seat back 5 has molded-in cavities for insertion of full length and partial length vertical reinforcement beams 6 and 14 spaced approximately 18 inches apart across the width of the back frame. The tops of the full length vertical beams 6 provide attachment for the upper shoulder belt fixtures 7, and the lower portion of the vertical beam provides attachment for mounting brackets 8 and recliner mechanism 16. The mounting brackets and recliner mechanisms provide attachment between the cushion frame rear cross beam 2 and back frame vertical beams, the brackets being attached to the beam by bolts 17 or the like and the recliner 16 at the end of the cross beam being attached to an insert cap 18 that is removably mounted in the end of the cross beam by bolts or the like.

As shown in FIG. 1, rear cross beam 2 is attached directly to the floor pedestal 11 without use of a seat track at the pedestal. The use of a track is optional for seat adjustment and is shown in the application for a split bench seat in FIG. 4 and for a captain's chair in the FIG. 5 illustration.

Also shown in FIG. 1 is an arm rest 9 and head rest 19 that can be mounted to the bench seat frame back by traditional mechanical attachment. The seat cushion includes an integral anti-submarine ramp 35, and the back includes integral blow molded back stand-offs 24. The standoffs are recessed portions on opposite sides of the blow molding, with the internal ends of the portions being fused together.

Split Bench Seat:

An automotive front seat lower split frame cushion 20 is shown in FIGS. 2 and 3. An exploded view of the cushion frame assembly is shown in FIG. 2, and a rear assembled view is shown in FIG. 3. The cushion body 21 is a one piece blow molded plastic unit, with integral occupant anti-submarine ramp 22 and integral side arm rest extension 23. A metal rear cross member 25 is assembled around the blow molded body to bridge the span between the two rear cushion attachment openings 26 (by which the seat is bolted to the vehicle) and the arm rest bracket 29, thereby reinforcing the cushion frame assembly. When an arm rest load 30 is applied as shown in FIG. 3, the cushion frame assembly transfers the load through the reinforcement body directly at the cushion lower attachment to the vehicle structure.

FIG. 4 shows a perspective view of a truck split bench seat frame with a blow molded cushion frame 31 that has a noncircular tubular insert rear cross beam 32 and a front cross round beam 33. The FIG. 4 embodiment shows two seats, with a left seat having a two point mount and a right seat having a three point mount. There is no center occupant shoulder belt provision in this embodiment. The rear cross beam provides lower belt attachment 34, recliner attachment 38, pivot bracket attachment 39, and track attachment 40. The tracks are mounted to the pedestal 36 so that when the tracks are adjusted, all the belts move with the seat. The lower end of the pedestal is mounted directly at the vehicle floor by flanges 41.

The upper seat back frame 43 includes a blow molded low back 45 with vertical cavities 49 extending along both sides for an inserted vertical reinforcement beam. In this case, a full length beam 46 is utilized on the outboard side of the seat back and a short beam 47 on the inboard side since the major shoulder belt load is on the side of the seat where the shoulder belt retractor 42 is mounted.

FIG. 4A shows a cross section through the back frame 45 and tubular beam 46 on the outboard side of the seat. As shown, the beam and the cavity in the frame are non-circular and specifically are generally rectangular, with the inner corner of the beam being beveled. The beam and cavity mate so that there is a snug fit between the beam and the frame cavity. FIG. 4B shows a similar section cut at the top of the back showing a short tube 48 inside of tube 46 for creation of a telescoping support tube for shoulder belt height adjustment. Belt retractor 42 is mounted to tube 48, and tube 48 is fastened to outer tube 46 by means of a bolt 54 that extends through a slot 56 in tube 48 and screws into an opening in tube 46, thereby providing limited vertical adjustment travel of the top mount belt retractor as shown by arrow 57.

FIG. 4C is a sectional view cut through the rear cross member 32 at the back of the cushion frame 31 showing the close fit of the two members and a non-circular shape for good anti-torsional displacement between the inserted rear cross member and the blow molded cushion frame. The rear cross section is generally rectangular with one corner beveled to provide increased clearance to the seated occupant.

FIGS. 4C and 4D are sections cut through the cushion front cross tube and show methods of restricting the front cross tube relative to the blow molded cushion frame. In this case, the front cross tube is a relatively small round cross section tube that is held in position inside the front cushion frame by an indentation 63 in the seat cushion, as shown in FIG. 4D and by extending through an opening in vertical plate 66, as shown in FIG. 4E. The tube is held in place at the ends by external plates 67 to which the ends of the tube are attached. The integrated seat cushion anti-submarine ramp 65 is shown as a region of the one piece blow molded cushion.

Captain's Chair:

FIG. 5 shows a pair of captain's chairs 70 of the type that would be utilized in the first two rows of a van. The captain's chair has a blow molded back frame 75 that integrates a fixed head rest 77 and provides cavities 78 for insert beams on both sides of the seat back such that the same tooling can be utilized for a driver or passenger seat.

In this case, a full length beam 76 with a roller d-ring shoulder belt anchorage 80 is utilized on the outboard side and a shorter tube 81 on the inboard side. The inboard tube supports the arm rest 82.

A structural shoulder-belt load-carrying recliner 88 is utilized to connect the back frame directly to the seat track 90. A smaller recliner or pivot bracket 89 is utilized to attach the seat back to the inboard track. The tracks are mounted directly to the floor pedestals 91.

For the illustrated captain's chair design, all belt loads by-pass the blow molded lower seat cushion pan frame 101. The cushion pan has an integral anti-submarine ramp 95 with reinforcing standoffs 94. This permits use of a light, one-piece blow molded cushion without inserted reinforcement tubes, although metal reinforcement is utilized for the cushion pan attachment 93. The principle of a hollow closed section with stand-offs 94 is utilized to create a blow molded cushion pan with good torsional resistance by virtue of the closed section. Preferably the cushion is a talc-filled polyethylene because of its good cold temperature impact, good ductility, and relatively low material cost. FIG. 6 shows a side view of the blow molded seat cushion pan frame 101.

An exploded view of the components that comprise the shoulder belt height adjuster is shown to the side of the seat back in FIG. 5A. The D-ring 80 mounts to a telescoping tube 105 that fits inside the back vertical beam and is attached in the same manner as the FIG. 4 embodiment. A suitable power or manual mechanism 106 attached to the telescoping tube and back beam is utilized to propel the shoulder belt anchorage vertically.

FIGS. 7A and 7B show the principle of good load path management. A side view and partial rear view schematic is shown. The occupant belt load at 117 is reacted at the upper shoulder belt anchorage 118 and the recliner 119 at the lower end, with the blow molded seat back reacting a smaller portion of the lateral belt load component. These reaction forces are further reacted at the track 90 and pedestal floor 121 where the arrow represents the direction of load and subsequent reaction forces throughout the seat.

One method of designing an efficient low mass structure is to react all applied loads directly in-line so as to minimize eccentric loading and subsequent lower stresses on the seat frame. For an integral restraint seat, the center line of the reaction should be in-line with the vertical back beam center, and likewise the recliner should be mounted inside the back beam to place their respective centers near another. The track should be vertical and mounted directly to the recliner. The term vertical track means the track is larger in cross section in the vertical direction than the horizontal direction. Since the seat belt load creates a vertical bending moment on the track, a vertical track will be stronger and more efficient than a horizontal track cross section.

The floor pedestal and track should be mounted directly along side one another and their center axes should be relatively in-line with the upper back reinforcement and belt retractor for efficient use of structural mass. The partial rear view FIG. 7B shows these components relatively in-line to each other's center axis.

After structural components are arranged properly, the structural members should be designed from high strength ductile material to permit the use of thin wall components thereby reducing mass.

The insert beams, recliner, tracks, and pedestal are all designed in high strength materials. The non-belt loaded components are designed as hollow, closed section, blow molded filled polyethylene. In the case of a captain's chair, the lower seat cushion pan and entire back can be designed as an extremely light weight plastic blow molding, although the outboard side of the seat back must be inserted with a roll formed steel tubular beam to handle the aforementioned belt load management.

The foregoing are exemplary of the present invention. Other arrangements and details of construction are possible without departing from the spirit and scope of the present invention, as defined in the appended claims.

I claim:

1. A seat with a front and an opposing back, the seat also having opposing first and second sides that extend between the front and the back, said seat comprising:

a pedestal;

a structural cross member connected with said pedestal and generally extending at least partially between the first and the second sides;

a seat cushion member formed of a moldable material with an upper surface contoured to receive and support the buttocks of a user in a seated position, said seat cushion member having an elongated seat cavity extending at least partially between the first and the second sides, said structural cross member being positioned in said seat cavity, said seat cushion member being supported above a floor by said pedestal and said structural cross member;

a seat back member formed of a moldable material with a forward surface adapted to receive and support at least a portion of the back of a user in a seated position, said seat back member having a base located near said seat cushion member and an opposing top, said seat back member having an elongated back cavity extending at least partially from said base to said top, said seat back member being connected with said structural cross member; and a reinforcement beam positioned in said back cavity and connected with said structural cross member, whereby said pedestal, said structural cross member, and said reinforcement beam comprise a structural frame of said seat.

2. The seat defined in claim 1 wherein said back cavity and said reinforcement beam are located along one of the first and the second sides of said seat.

3. The seat defined in claim 2 wherein said seat has at least two seating positions to receive and support at least two users, wherein said seat back member has at least two of said back cavities with said back cavities corresponding to each of said at least two seating positions, and wherein said seat has at least two of said reinforcement beams with said reinforcement beams being positioned in corresponding back cavities.

4. The seat defined in claim 3 wherein said seat cavity has a cross-sectional shape and said structural cross member has a corresponding cross-sectional shape adapted to resist slip between said structural cross member and said seat cavity.

5. The seat defined in claim 4 wherein each said back cavity has a cross-sectional shape and each said reinforcement beam has a corresponding cross-sectional shape adapted to resist slip between said reinforcement beam and said back cavity.

6. The seat defined in claim 5 wherein a pivot mechanism is interposed between said structural cross member and at least one of said reinforcement beams.

7. The seat defined in claim 6 further including a second pedestal, said structural cross member being connected with said second pedestal.

8. The seat defined in claim 1 wherein a pivot mechanism is interposed between said structural cross member and at least one of said reinforcement beams.

9. The seat defined in claim 1 wherein said seat has at least two seating positions to receive and support at least two users, wherein said seat back member has at least two of said back cavities with said back cavities corresponding to each of said at least two seating positions, and wherein said seat has at least two of said reinforcement beams with said reinforcement beams being positioned in corresponding back cavities.

10. The seat defined in claim 9 wherein said seat cavity has a cross-sectional shape and said structural cross member has a corresponding cross-sectional shape adapted to resist slip between said structural cross member and said seat cavity.

11. The seat defined in claim 10 wherein each said back cavity has a cross-sectional shape and each said reinforcement beam has a corresponding cross-sectional shape adapted to resist slip between said reinforcement beam and said back cavity.

12. A seat with a front and an opposing back, the seat also having opposing first and second sides that extend between the front and the back, said seat comprising:

a first pedestal located near the first side;

a second pedestal spaced from said first pedestal and located near the second side;

a structural cross member connected with said first and said second pedestals, said structural cross member extending at least partially between the first and the second sides;

a seat cushion member formed of a moldable material with an upper surface contoured to receive and support the buttocks of a user in a seated position, said seat cushion member having an elongated seat cavity extending at least partially between the first and the second sides, said structural cross member being positioned in said seat cavity, said seat cushion member being supported above a floor by said first and said second pedestals and said structural cross member;

a seat back member formed of a moldable material with a forward surface adapted to receive and support at least a portion of the back of a user in a seated position, said seat back member having a base located near said seat cushion member and an opposing top, said seat back member having two elongated back cavities extending at least partially from said base to said top, one of said two back cavities extending along the first side and the other of said two back cavities extending along the second side, said seat back member being connected with said structural cross member; and a reinforcement beam positioned in one of said two back cavities and connected with said structural cross member, whereby said first and said second pedestals, said structural cross member, and said reinforcement beam comprise a structural frame of said seat.

13. The seat defined in claim 12 wherein said seat has a number of said back cavities evenly spaced between said two back cavities with a seating position to receive and support a user being defined between adjacent ones of said back cavities, and wherein said seat also has said number of said reinforcement beams with each of said number of said reinforcement beams being positioned in a corresponding one of said number of said back cavities.

14. The seat defined in claim 13 wherein said seat cavity has a cross-sectional shape and said structural cross member has a corresponding cross-sectional shape adapted to resist slip between said structural cross member and said seat cavity.

15. The seat defined in claim 14 wherein each said back cavity has a cross-sectional shape and each said reinforcement beam has a corresponding cross-sectional shape adapted to resist slip between said reinforcement beam and said back cavity.

16. The seat defined in claim 15 wherein a pivot mechanism is interposed between said structural cross member and at least one of said reinforcement beams.

17. The seat defined in claim 12 wherein a pivot mechanism is interposed between said structural cross member and at least one of said reinforcement beams.

18. A seat with a front and an opposing back, said seat also having opposing first and second sides that extend between the front and the back, said seat comprising:

a structural frame, including, a pedestal, a structural cross member that is connected with said pedestal, and a beam that is connected with said structural cross member;

a seat cushion supported by said pedestal and said structural cross member, said seat cushion being formed of a moldable material with an upper surface contoured to receive and support the buttocks of a user in a seated position, upon said structural frame, said seat cushion further having an elongated seat cavity extending at least partially between the first and the second sides and said structural cross member being located in said seat cavity; and a seat back supported by said structural cross member and said beam, said seat back being formed of a moldable material with a forward surface adapted to receive and support at least a portion of the back of a user in a seated position, upon said structural frame, said seat back having a base located near said seat cushion and an opposing top, said beam extending at least partially between said base and said top.

19. The seat defined in claim 18 wherein said seat back member has a base located near said seat cushion member and an opposing top, wherein said seat back member has an elongated back cavity extending at least partially from said base to said top, and wherein said beam is located in said back cavity.

20. The seat defined in claim 19 wherein said seat has at least two seating positions to receive and support at least two users, wherein said seat back member has at least two of said back cavities with said back cavities corresponding to each of said at least two seating positions, and wherein said seat has at least two of said beams with said beams being positioned in corresponding back cavities.

21. The seat defined in claim 20 wherein each said back cavity has a cross-sectional shape and each said beam has a corresponding cross-sectional shape adapted to resist slip between said beam and said back cavity.

22. The seat defined in claim 21 wherein a pivot mechanism is interposed between said structural cross member and at least one of said beams.

23. The seat defined in claim 22 further including a second pedestal, said structural cross member being connected with said second pedestal.

24. The seat defined in claim 19 wherein said seat cavity has a cross-sectional shape and said structural cross member has a corresponding cross-sectional shape adapted to resist slip between said structural cross member and said seat cavity.

25. The seat defined in claim 18 wherein said seat has at least two seating positions to receive and support at least two users and wherein said structural frame has a number of said beams so that each of said at least two seating positions is supported by at least one of said beams.

26. The seat defined in claim 20 wherein a pivot mechanism is interposed between said structural cross member and at least one of said number of beams.

27. The seat defined in claim 18 wherein a pivot mechanism is interposed between said structural cross member and said beam.

* * * * *

UNITED STATES PATENT AND TRADEMARK OFFICE
CERTIFICATE OF CORRECTION

PATENT NO. : 5,575,533
DATED     : 11/19/96
INVENTOR(S) : Patrick M. Glance

It is certified that error appears in the above-identified patent and that said Letters Patent is hereby corrected as shown below:

Claim 11, line 59:

"10 should be --9--;

Claim 26, line 53:

"20" should be --25--.

Signed and Sealed this

Twelfth Day of August, 1997

Attest:

Attesting Officer

BRUCE LEHMAN

Commissioner of Patents and Trademarks